T. W. COSTELLO.
TIRE RIM FOR USE ON AUTOMOBILES AND OTHER VEHICLES.
APPLICATION FILED JULY 24, 1919.
1,394,252.
Patented Oct. 18, 1921.
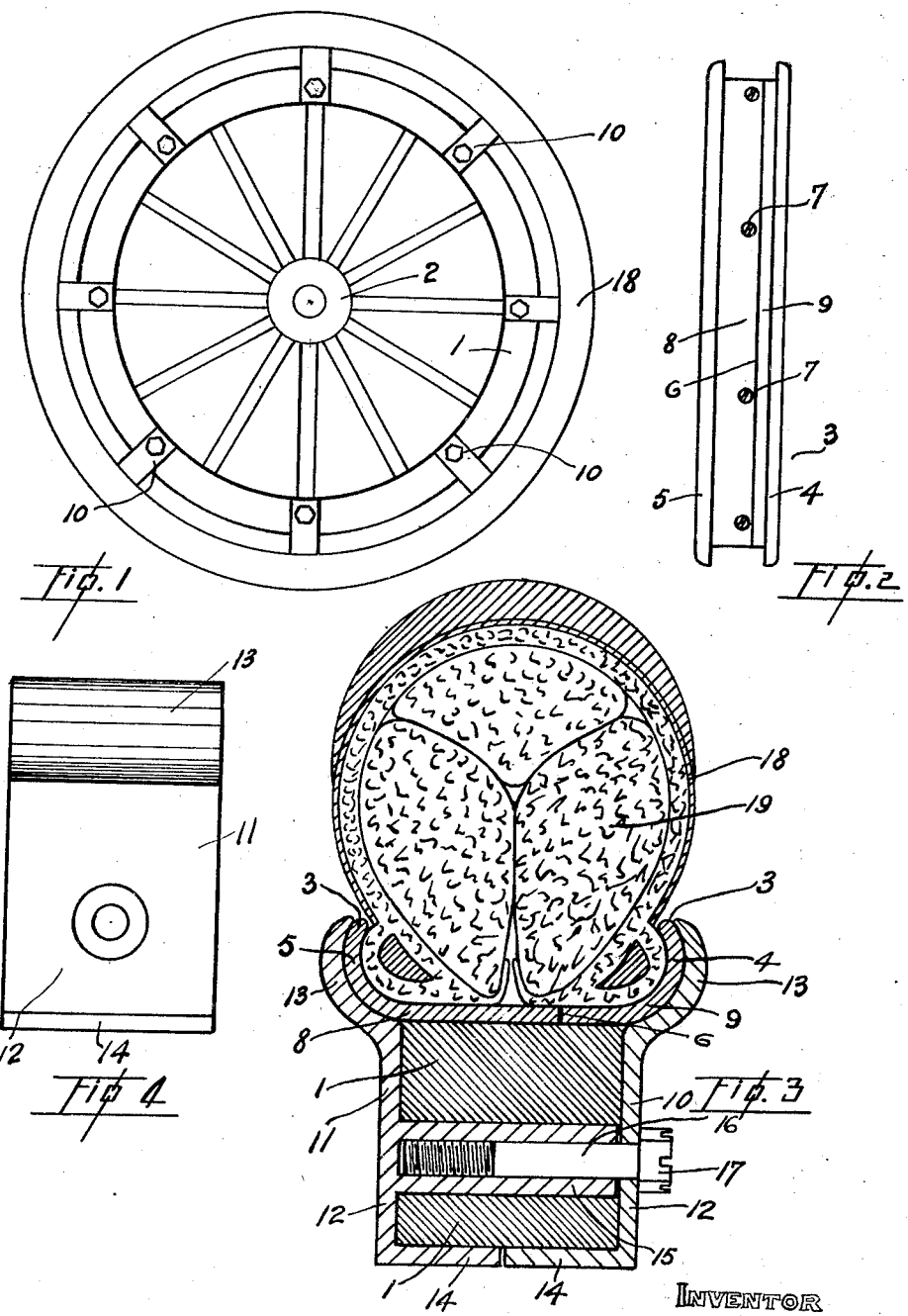
INVENTOR
Thomas William Costello.

UNITED STATES PATENT OFFICE.

THOMAS WILLIAM COSTELLO, OF SAN FRANCISCO, CALIFORNIA.

TIRE-RIM FOR USE ON AUTOMOBILES AND OTHER VEHICLES.

1,394,252. Specification of Letters Patent. Patented Oct. 18, 1921.

Application filed July 24, 1919. Serial No. 313,047.

*To all whom it may concern:*

Be it known that I, THOMAS WILLIAM COSTELLO, a citizen of the United States, and a resident of the city of San Francisco, in the State of California, United States of America, have invented certain new and useful Improvements in Tire-Rims for Use on Automobiles and other Vehicles, of which the following is a specification.

This invention relates to improvements in that type of metal wheel rims generally known as clencher rims used on automobiles or other vehicles of like character which are equipped with clencher tires made of rubber, cord or fabric tire casings containing fillers such as elastic sponge rubber or the like. This invention essentially consists of a combination of (1) wheel felly, (2) of circumferentially divided clencher rim members, one of which is secured to the wheel felly periphery, and (3) of means for securing the free portion of the rim and the tire in place, said means consisting of clamps arranged in pairs around the wheel felly on each side thereof having their outer ends adapted to bear on the rim clenches, the members of each respective pair being detachably connected one to the other by means of internally threaded hollow steel bushings formed integral with one member passing through holes drilled through the wood felly, and of externally threaded screws passing through the clamp of the other member, into the hollow steel bushing itself.

The object of my invention is to provide a simple and effective means the use of which enables tires containing rubber fillers or the like to be put in place very easily and expeditiously by the application of equal pressure all around the metal rim, and without the use of stretching tools or other such devices commonly used at the present time and which are inconvenient, inefficient and slow in application; in effect, the object is to provide a demountable split clencher rim which allows the rubber or fabric outer casing and its rubber filler to be assembled thereon or removed therefrom with greater ease and convenience and in less time than is possible with the methods in present use.

I attain this object by the construction illustrated in the accompanying drawings in which—

Figure 1 is a side view of an automobile wheel with which my invention is embodied.

Fig. 2 is an edge view of the rim.

Fig. 3 is a cross section of the tire.

Fig. 4 is a detail view of a clamp.

Similar figures of reference indicate similar parts throughout the several views.

1 indicates the wooden felly of the wheel 2 on which is mounted the clencher rim 3, the clenches being indicated by the numerals 4 and 5. The felly and rim are of the usual construction. The rim 3, however, for the purpose of this invention is split circumferentially, the division being indicated by the numeral 6 in Figs. 2 and 3, and while it may be divided along the center line it is preferable to divide it on one side thereof so as not to disturb the screws 7 by means of which the rim is secured to the felly. The rim being thus formed in two portions 8 and 9, one of which, 8 is secured in the usual manner by the screws 7, it is necessary to provide for the securing of the portion 9 and this is effected by means of a number of clamps 10 and 11 each of which consists of a flat plate 12 adapted to lie on the side of the wood felly and the outer ends of which clamps are formed similarly to the clenches of the rim as at 13 while their inner ends are turned inwardly at right angles to extend under and lie on the innerside of the wood felly, as at 14, being extended approximately to the center, as shown in Fig. 3. These clamps are arranged in pairs on each side of the felly and are spaced equidistant around the same, and those on one side, 11, are each provided with an internally threaded hollow steel bushing 15 adapted to extend through the felly so that an externally threaded screw 16 passed through the clamp 10 on the opposite side may be threaded into the bushing 15, as shown in Fig. 3. The heads 17 of the screws are preferably of castellated construction.

18 indicates the tire casing filled, as indicated, with an elastic sponge rubber core 19.

The manner in which the invention is used will be obvious, on reference being had to Figs. 1 and 3, in which latter view a cross section of the assembled tire is shown. To remove the casing all that is necessary is to unscrew the screws 16 and remove the side clamps 10 and the portion 9, when the casing may be readily pulled off. The replacing of the casing and filler is effected with equal facility, as, the clamps 10 being off, the casing and filler are placed around the rim, the tire itself being then in an expanded condition, the portion 9 having first of all been remounted in place when, by returning the clamps 10 to place and inserting and tightening up the screws 16 equally all around so as to exert an equal pressure acting externally on the tire casing beads, the same is forced into place and securely held in the clenches 4 and 5.

It will thus be seen that I have devised a demountable clencher rim for use on automobiles and vehicles of like character, which is of great convenience and utility, and is particularly adapted to the specific purpose of mounting and demounting tire casings containing elastic sponge rubber fillers or the like, which said tires require to be mounted on rims under lateral pressure through force exerted under the principle of external contraction.

What I claim as my invention is—

A pressure clamp for securing a circumferentially divided clencher rim to a wheel felly comprising a pair of complementary plates adapted to be engaged with opposite sides of the felly, each of said plates having its outer end extended beyond the felly and bent in a curvilinear manner to embrace one of the rim flanges, the inner ends of said plates being directed inwardly at right angles to extend across the inner side of the felly in engagement therewith and to a point located substantially midway the width of the felly, one of said plates having a right angularly directed hollow sleeve integral with the inner face thereof and adapted to extend transversely through the body of the felly in the direction of the opposite plate, said last-mentioned plate having an opening corresponding in diameter to the bore of the said sleeve and alined with the said bore to provide an entrance thereto, said sleeve being internally threaded, and a bolt having the threaded end thereof threadedly engaged in said sleeve through the said opening, the head of the bolt serving to close the opening against the entrance of dust, dirt and the like, thus protecting the threads of the bolt and the sleeve.

Dated at San Francisco, California, this 17th day of June, 1919.

THOMAS WILLIAM COSTELLO.